United States Patent [19]

Andrews

[11] Patent Number: 4,682,803
[45] Date of Patent: Jul. 28, 1987

[54] FISH TONGS

[76] Inventor: Kenneth C. Andrews, 905 Burnside Ave., East Hartford, Conn. 06108

[21] Appl. No.: 876,128

[22] Filed: Jun. 19, 1986

[51] Int. Cl.$^4$ .............................................. B25G 7/12
[52] U.S. Cl. ........................................ 294/25; 294/16
[58] Field of Search ................ 294/26, 25, 16, 15, 294/1.1, 33, 815, 11, 99.1, 106, 131; 2/16, 20, 160, 161 R, 161 A; 43/5, 53.5; 17/66, 70

[56] References Cited

U.S. PATENT DOCUMENTS 2,643,151 6/1953 Zupancic .
2,881,022 4/1959 Brust ................................... 294/25
3,181,198 5/1965 Stelzen ................................ 294/25
3,389,491 6/1968 Lowrey .
3,632,151 1/1972 Wosnitzky ........................... 294/16
3,975,043 8/1976 Miles .................................... 294/25
3,978,605 9/1976 Maruniak .

Primary Examiner—James B. Marbert

[57] ABSTRACT

A hand-held, pincer-like device for providing a secure grip upon a fish comprises substantially identical rigid panels which are hingedly connected to one another to permit facile opening and secure closing, and which have friction-enhancing interior surfaces thereon.

5 Claims, 5 Drawing Figures

FISH TONGS

BACKGROUND OF THE INVENTION

It is fairly common practice for fishermen to wear gloves to protect their hands, and also to improve their ability to hold the fish that they catch while the hook is being removed, during cleaning, etc. Gloves however can be quite inconvenient and uncomfortable, and they may not provide desired levels of protection and grip-enhancement; they also tend to wear out rather quickly.

The need for other means for improving the ability to handle fish has previously been recognized in the art. For example, in U.S. Pat. No. 3,389,491 Lowrey discloses a device for holding a fish which consists of a one-piece sheet of resilient, flexible material formed into an oval channel and having bendable sections; while still on the line, the fish is inserted into the channel and is held in place by the application of finger pressure, to bend the flexible sections inwardly upon it. Mechanical devices for the same general purpose have been described by Zupancic in U.S. Pat. No. 2,643,151, and by Maruniak in U.S. Pat. No. 3,978,605.

Despite the foregoing, a demand remains for a hand-held device for assisting a fisherman in securely holding a live fish, while protecting his hand against injury, which is of simple and inexpensive construction and is yet highly effective and convenient to use. It is of course also desirable that any such device not cause injury to the fish, such as might result from the use of devices with which mechanical advantage may be generated.

Accordingly, it is the broad object of the present invention to provide a novel device for enhancing the grip upon a fish, while protecting the user against injury.

It is a more specific object of the invention to provide such a device which can be used with either hand, and for gently and yet securely grasping fish of a wide range of sizes.

Additional objects of the invention are to provide a device having the foregoing features and advantages which is, in addition, relatively inexpensive and facile to manufacture, durable, and highly convenient and comfortable to use.

SUMMARY OF THE INVENTION

It has now been found that certain of the foregoing and related objects of the invention are readily attained by the provision of a hand-held, pincer-like device consisting of a pair of substantially identical, rigid panels connected to one another along one edge by a hinge member, the panels being freely pivotable thereabout to permit opening and closing of the device. The panels are configured to conform generally to the body of a fish held between them, and friction-enhancing elements are provided on the interior surfaces thereof. Means on both of the panels is adapted to overlie and engage the thumb and fingers of the user thereunder when the hinge member is disposed along his palm, permitting displacement of the panels from one another by a spreading action of the user's hand.

In the preferred embodiments of the invention the panels of the device will be generally rectangular and outwardly bowed, with respect to a plane through the hinge member and lying therebetween. The device will normally be fabricated from a synthetic resinous material, and most desirably both panels and the hinge member of which the device is comprised will be integrally formed, as a single piece.

The friction-enhancing elements will advantageously comprise a multiplicity of spike formations disposed upon the interior surfaces of the panels, and the engaging means may comprise laterally extending strips on the exterior thereof. The strips may be relatively rigid, and they will be spaced from the hinge member to receive the tips of the user's thumb and fingers inserted under them. In addition, the exterior surfaces of the panels may have means thereon for enhancing security of the grip, which may desirably comprise a series of transversely spaced, laterally extending rib formations.

DETAILED DESCRIPTION OF THE ILLUSTRATED EMBODIMENTS

Figure 1:
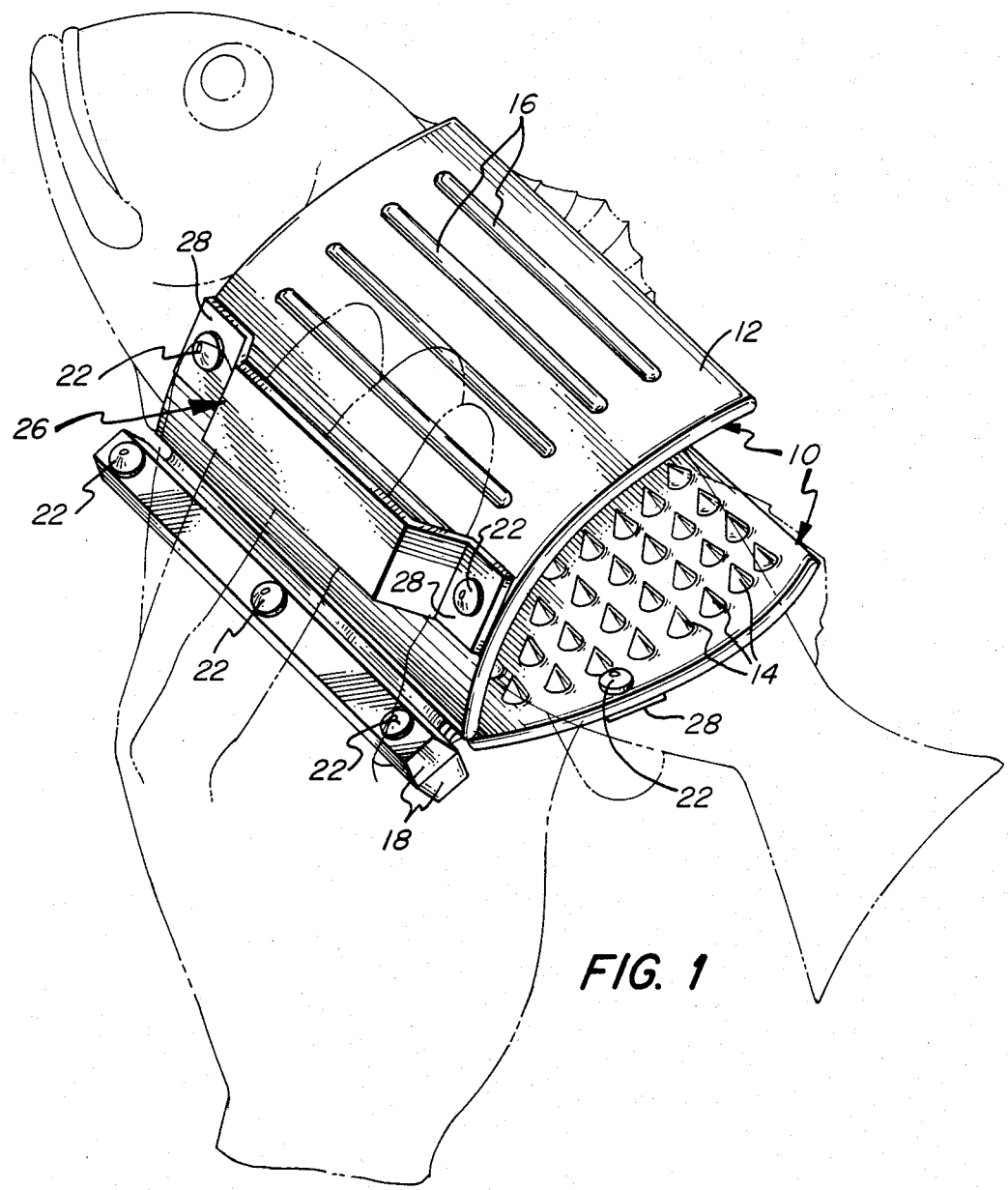
FIG. 1 is a perspective view of one form of the device of the invention in use, with the grasped fish and the user's hand both being shown in phantom line.
Figure 2:
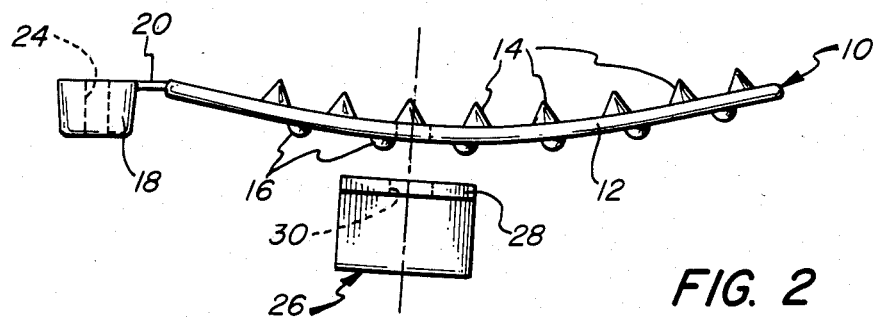
FIG. 2 is an exploded end view of one of the jaw members of which the device is comprised.
Figure 3:
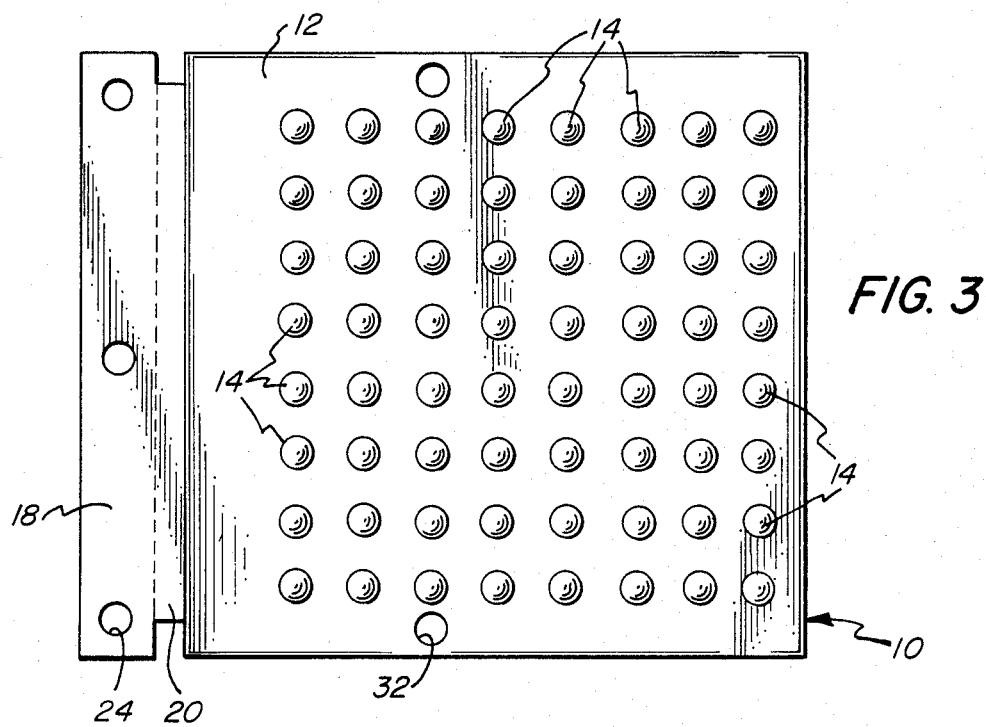
FIG. 3 is a plan view showing the inside surface of the integrally formed components of a jaw member.

Turning now in detail to FIGS. 1-4 of the drawings, therein illustrated is a device embodying the present invention and consisting of a pair of hingedly connected, substantially identical jaw members, generally designated by the numeral 10. The jaw members 10 comprise generally rectangular panel portions 12 of slightly curved, outwardly bowed cross-sectional configuration; each has a pattern of spikes 14 on its inside surface, and a series of laterally extending rib formations 16 on the outside surface thereof. A rectilinear connecting bar portion 18 is integrally formed with the panel portion 12 of each jaw member 10 and extends therealong, and the two portions 12, 18 are interconnected by a relatively thin, integral web section 20 extending therebetween.

A relatively rigid strip, generally designated by the numeral 26, is formed into a wide U-shaped configuration and is secured against the exterior surface of each of the jaw member panel portions 12. Rivets 22, passing through aligned apertures 24, are used to affix the bar portions 18 in face-to-face relationship; similar fasteners are seated in holes 28, formed through the end tabs 30 of the strips 26, and in aligned apertures 32 in the panel portions 12, to affix the strips in place.

As can be seen, the bent strips 26 serve to engage the ends of the fingers and thumb of the user's hand inserted therethrough, to hold the device in position while permitting opening and closing forces to be exerted upon its opposite sides. It will be appreciated that the strips are located to facilitate use of the device in either hand, and are formed to permit quick placement and removal. Although not illustrated, it will also be desirable to space the strips 26 different distances from the bar portion 18 so as to most comfortably and effectively accommodate the thumb and fingers. Specifically, the longitudinal center line for the thumb-engaging strip may be about 1¼ inches from the corresponding hinge element, and the finger-engaging strip on the opposite side may be spaced about 1¾ inches therefrom.

Figure 4:
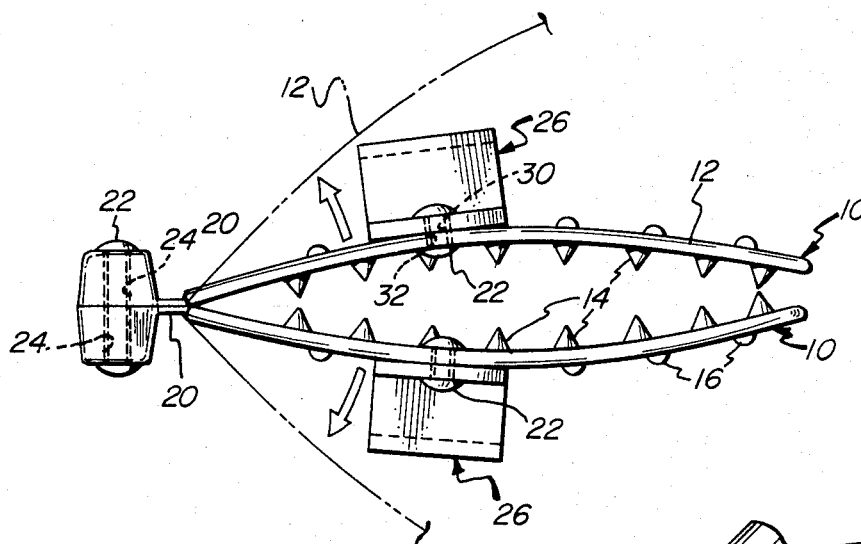
FIG. 4 is an end view showing the device in closed (full line) and open (phantom line) positions.

FIG. 4 best illustrates closed and opened positions of the jaw members, and it will be self-evident that the panels will be spread to receive the fish and thereafter closed upon it to establish a secure grip. The jaw members shown are fabricated from a synthetic resinous material which is substantially rigid in relatively thick sections (e.g., those of the panel portions 12 and bar portions 18) and flexible in relatively thin sections (e.g., as in the connecting web portions 20). Thus, the inherent flexibility of the web sections 20 permits the desired hinging action, and the rigidity of the panel portions 12 ensures that a firm and protected, and yet relatively gentle, grip can be exerted upon the fish.

Figure 5:
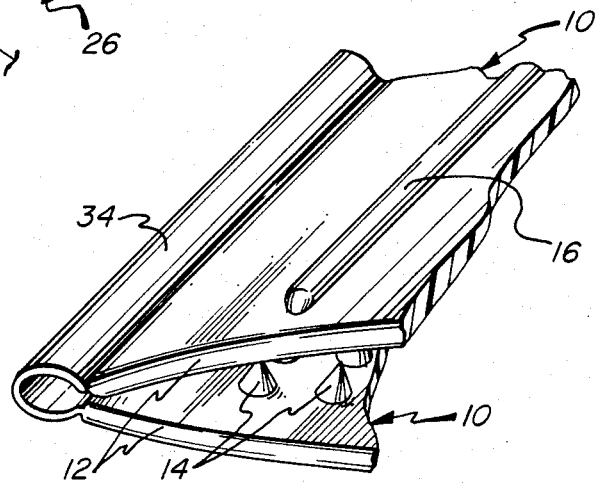
FIG. 5 is a fragmentary perspective view showing the connected marginal portions of the panels of which a second embodiment of the devices of the invention is comprised, the hinge member being integrally formed therewith.

Turning now in detail to FIG. 5, a second form of the devices of the invention is illustrated. In this embodiment, the two panel portions 12 are integrally formed with a relatively thin, U-shaped hinge section 34, which provides the connection therebetween. Such a construction permits the device to be made in a single molding operation, albeit that integral formation of the handle strips 26 may require rather complex tooling and, for that reason, may not be desirable as a practical matter. It will be appreciated that the hinge portion 34 will desirably be of sufficient thickness to maintain a preset relationship between the jaw members 10, while being sufficiently flexible to enable facile displacement of the panel portions therefrom.

Although specific synthetic resinous materials suitable for fabrication of the plastic parts of the device will be evident to those skilled in the art, it might be mentioned that polypropylene and acetal resins may be particularly advantageous. It will also be apparent that various modifications may be made in the form and construction of the device, without departing from the concepts of the invention. For example, the shape of the jaw members may be altered, as may be the configuration and nature of the means by which the fingers of the user are engaged. In any event, however, the jaw members must be readily displaceable with one hand, and must be sufficiently rigid to afford secure grasping, protection for the user, and durability to the device.

Thus, it can be seen that the present invention provides a novel device for enhancing the grip upon a fish, and for protecting the user against injury. The device can be used with either hand and for securely and yet gently grasping fish of a wide range of sizes; it is durable, relatively inexpensive and facile to manufacture, and is highly convenient and comfortable to use.

Having thus described the invention, what is claimed is:

1. A hand-held, pincer-like device for assisting in grasping a fish, comprising: a pair of substantially identical rigid panels connected to one another along one edge by a hinge member and freely pivotable thereabout, said panels having friction-enhancing elements on the interior surfaces thereof and being curved to conform generally to the body of a fish held therebetween, said hinge member being comprised of a pair of relatively rigid bar portions and flexible web sections, one of said web sections connecting an associated one of said bar portions to one of said panels, each of said connected bar portions, web sections and panels being integrally formed as a single piece from a synthetic resinous material; and engaging means on both of said panels adapted to overlie and engage the thumb and fingers of one of the user's hands thereunder with said hinge member disposed along his palm, said engaging means comprising a laterally extending, relative rigid strip on the exterior of each of said panels, each of said strips being spaced transversely from said hinge member and having an elongated central section spaced from the surface of said panel to receive the ends of the user's thumb and fingers inserted thereunder, whereby said panels can be displaced from one another to open said device by a spreading action of the user's thumb and fingers.

2. The device of claim 1 wherein the exterior surfaces of said panels have means thereon for enhancing security of the grip thereon.

3. The device of claim 2 wherein said security enhancing means comprises a series of transversely spaced, laterally extending rib formations.

4. The device of claim 1 wherein said panels are of generally rectangular configuration, and are outwardly bowed with respect to a plane therebetween and extending through said hinge member.

5. The device of claim 1 wherein said friction-enhancing elements comprise a multiplicity of spike formations disposed upon said interior surfaces of said panels.

* * * * *